United States Patent
Kalariya et al.

(10) Patent No.: US 12,153,860 B2
(45) Date of Patent: Nov. 26, 2024

(54) SIMULATION TECHNIQUES FOR DETERMINING DEFORMATION PROFILES AND RESIDUAL STRESSES IN MOLDED PARTS HAVING COMPOSITE MATERIALS

(71) Applicant: Tata Consultancy Services Limited, Mumbai (IN)

(72) Inventors: Yagnik Pravinchandra Kalariya, Pune (IN); Amit Gangadhar Salvi, Pune (IN); Purushottham Gautham Basavarsu, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 960 days.

(21) Appl. No.: 17/174,684

(22) Filed: Feb. 12, 2021

(65) Prior Publication Data
US 2021/0294937 A1 Sep. 23, 2021

(30) Foreign Application Priority Data
Mar. 11, 2020 (IN) .............................. 202021010408

(51) Int. Cl.
*G06F 30/17* (2020.01)
*G06F 30/23* (2020.01)
(Continued)

(52) U.S. Cl.
CPC .............. *G06F 30/17* (2020.01); *G06F 30/23* (2020.01); *G06F 2113/22* (2020.01);
(Continued)

(58) Field of Classification Search
CPC .......... G06F 30/00; G06F 30/17; G06F 30/23; G06F 2113/22; G06F 2113/26;
(Continued)

(56) References Cited

FOREIGN PATENT DOCUMENTS

JP 2018055509 A * 4/2018

OTHER PUBLICATIONS

Yuan, Zhenyi et al. et al., "Evolution of Curing Residual Stresses in Composite using Multi-Scale Method", Aug. 4, 2018, Composites Part B 155, Elsevier Ltd. (Year: 2018).*

(Continued)

*Primary Examiner* — Cedric Johnson
(74) *Attorney, Agent, or Firm* — FINNEGAN, HENDERSON, FARABOW, GARRETT & DUNNER, LLP

(57) ABSTRACT

Conventional approaches of physical experiments for the effects of cure kinetics in composites materials may lack in capturing lower length scale effects at bulk level. The computational state of the art approaches has not focused on the issue of scale bridging between multiple length scales for manufacturing effects in composites. This limits its usability for specific materials or situations. Embodiments of the present disclosure provide systems and methods that implement a multiscale analysis for determining residual stress and deformation profiles in molded parts comprising composite material. More specifically, present disclosure implements the multiscale analysis wherein a thermal chemical analysis and thermal mechanical analysis are linked to achieve two-way coupling for curing effects at each node/ point of molded parts having composite material to provide flexibility and versatility in terms of exploring multiple material combinations without major modification in the approach.

12 Claims, 9 Drawing Sheets

(51) Int. Cl.
*G06F 113/22* (2020.01)
*G06F 113/26* (2020.01)
*G06F 119/08* (2020.01)
*G06F 119/14* (2020.01)

(52) U.S. Cl.
CPC ...... *G06F 2113/26* (2020.01); *G06F 2119/08* (2020.01); *G06F 2119/14* (2020.01)

(58) Field of Classification Search
CPC ............. G06F 2119/08; G06F 2119/14; G06F 2111/10; G06F 30/20
USPC .......................................................... 703/1
See application file for complete search history.

(56) References Cited

OTHER PUBLICATIONS

Bakhtiarizadeh, "Integration of Process Simulation with Damage Modelling of Composite Laminates Using Layerwise Elements," Thesis, The University of British Columbia (2015).
Baran et al., "A Review on the Mechanical Modeling of Composite Manufacturing Processes," Arch Computat Methods Eng (2016).
Cater, "Multiscale Modeling of Composite Laminates with Free Edge Effects," Dissertation, Michigan State University (2015).
D'Mello et al., "Effect of the curing process on the transverse tensile strength of fiber-reinforced polymer matrix lamina using micromechanics computations," Integrating Materials and Manufacturing Innovation, 4:7 (2015).

* cited by examiner

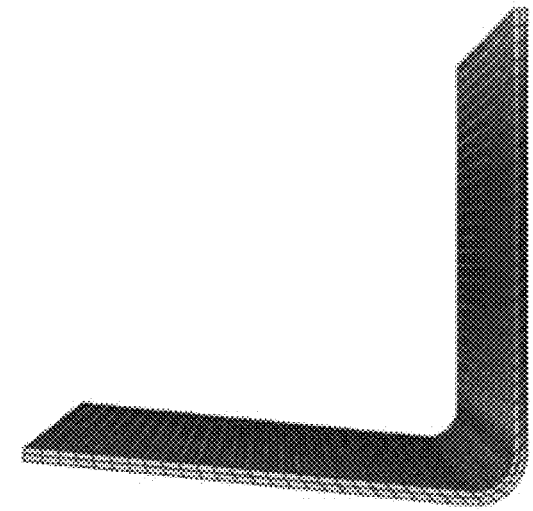
FIG. 6A Residual Stress
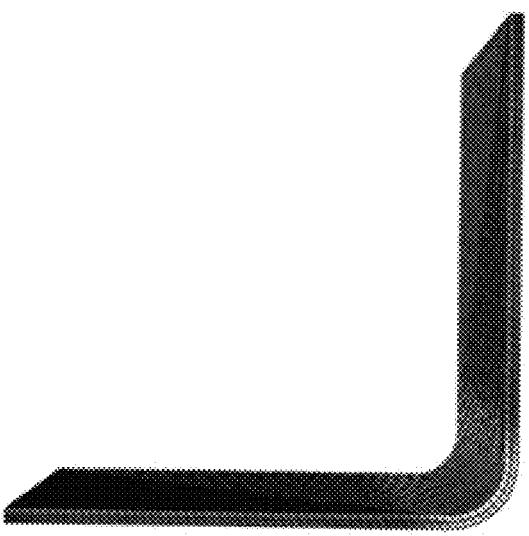
FIG. 6B Deformation Profile
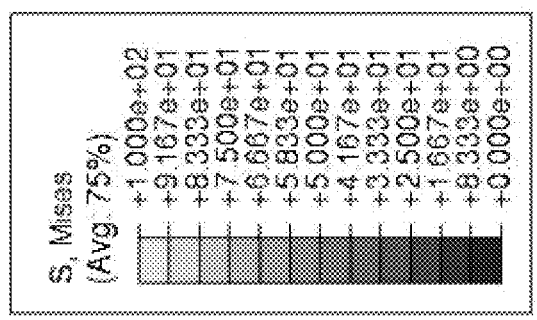

SIMULATION TECHNIQUES FOR DETERMINING DEFORMATION PROFILES AND RESIDUAL STRESSES IN MOLDED PARTS HAVING COMPOSITE MATERIALS

PRIORITY CLAIM

This U.S. patent application claims priority under 35 U.S.C. § 119 to: India Application No. 202021010408, filed on Mar. 11, 2020. The entire contents of the aforementioned application are incorporated herein by reference.

TECHNICAL FIELD

The disclosure herein generally relates to multiscale analysis of molded parts having composite materials, and, more particularly, to simulation techniques for determining deformation profiles and residual stresses in molded parts having composite materials.

BACKGROUND

Composite materials have widely been adopted in aerospace industry over the years and has extended its applications in other areas such as automotive, marine, energy, defense, sports and many more. Fiber reinforced polymer (FRP) composites have been used for lightweight structures due to its high specific strength and stiffness. Parts of FRP composite are made using various manufacturing processes. Filament winding, laminating pre-preg plies and vacuum assisted resin transfer molding are few popular ones used in automotive, aerospace and defense industries. Depending on volume of parts produced and cycle time required, manufacturing processes and process parameters (such as type of hardeners and catalysts, temperature of the mold, vacuum pressure of the process, etc.) are finalized. After molding, these parts are then cured fully to achieve its final material properties. The materials properties of the final cured part change according to the parameters of the manufacturing process. However, dependency of material properties on curing process is not explicitly included in typical industrial design process of composites.

SUMMARY

Embodiments of the present disclosure present technological improvements as solutions to one or more of the above-mentioned technical problems recognized by the inventors in conventional systems. In one aspect, there is provided a processor implemented method for determining deformation profiles and residual stresses in molded parts having composite materials. The method comprises obtaining, via one or more hardware processors, at least one molded part based on a design requirement, wherein the at least one molded part comprises composite materials; creating, via a geometric Computer-Aided Design (CAD) modeling technique executed by the one or more hardware processors, a geometry model of the at least one molded part; obtaining, for the created geometry model, one or more constituent properties of the composite materials used for the at least one molded part; performing, via a multiscale modeling technique executed by the one or more hardware processors, thermo chemical analysis on one or more portions of the at least one molded part to obtain one or more curing profiles at the one or more portions by using the one or more constituent properties, wherein the one or more curing profiles are obtained by incrementally applying one or more temperature profiles on the one or more portions of the at least one molded part, and wherein the one or more curing profiles comprise (i) one or more levels of degree of cure and (ii) one or more updated constituent properties; and performing, via the multiscale modeling technique executed by the one or more hardware processors, thermo mechanical analysis on the one or more portions of the at least one molded part to determine residual stresses and one or more deformation profiles pertaining to the one or more portions of the at least one molded part based on the one or more curing profiles.

In an embodiment, wherein the geometry model comprises at least one of (i) one or more geometry properties and (ii) one or more material properties pertaining to manufacturing of the at least one molded part based on the design requirement. In an embodiment, the one or more geometry properties comprise at least one of (a) shape, (b) size, (c) ply thickness, (d) stacking sequence, and (e) an orientation of the composite materials. In an embodiment, the one or more material properties comprise at least one of (a) physical properties, (b) chemical properties, and (c) mechanical properties, and (d) thermal properties of the composite materials for manufacturing the at least one molded part based on the design requirement.

In an embodiment, the step of performing, via a multiscale modeling technique executed by the one or more hardware processors, thermo chemical analysis on one or more portions of the at least one molded part is preceded by setting one or more manufacturing process parameters based on the design requirement.

In an embodiment, the step of performing thermo chemical analysis one or more various portions of the at least one molded part comprises analyzing cure kinetics of the at least one molded part.

The method further comprises analyzing the determined residual stresses and one or more determined deformation profiles to determine one or more modifications in at least one of (i) design of the at least one molded part, (ii) a manufacturing process and one or more manufacturing process parameters associated thereof, and (iii) the composite materials.

Value associated with the determined residual stresses and the one or more determined deformation profiles are optimized based on the one or more determined modifications. In other words, the optimization of the manufacturing process parameters can be performed using the multiscale modeling technique to improve the quality of the structure and its design.

In another aspect, there is provided a system for determining deformation profiles and residual stresses in molded parts having composite materials. The system comprises a memory storing instructions; one or more communication interfaces; and one or more hardware processors coupled to the memory via the one or more communication interfaces, wherein the one or more hardware processors are configured for execution of the instructions to: obtain at least one molded part based on a design requirement, wherein the at least one molded part comprises composite materials; create, via a geometric Computer-Aided Design (CAD) modeling technique executed by the one or more hardware processors, a geometry model of the at least one molded part; obtain, for the created geometry model, one or more constituent properties of the composite materials used for the at least one molded part; perform, via a multiscale modeling technique executed by the one or more hardware processors, thermo chemical analysis on one or more portions of the at least one molded part to obtain one or more curing profiles at the one or more portions by using the one or more constituent properties, wherein the one or more curing profiles are obtained by incrementally applying one or more temperature profiles on the one or more portions of the at least one molded part, and wherein the one or more curing profiles comprise (i) one or more levels of degree of cure and (ii) one or more updated constituent properties; and perform, via the multiscale modeling technique executed by the one or more hardware processors, thermo mechanical analysis on the one or more portions of the at least one molded part to determine residual stress and one or more deformation profiles pertaining to the one or more portions of the at least one molded part based on the one or more curing profiles.

In an embodiment, wherein the geometry model comprises at least one of (i) one or more geometry properties and (ii) one or more material properties pertaining to manufacturing of the at least one molded part based on the design requirement. In an embodiment, the one or more geometry properties comprise at least one of (a) shape, (b) size, (c) ply thickness, (d) stacking sequence, and (e) an orientation of the composite materials. In an embodiment, the one or more material properties comprise at least one of (a) physical properties, (b) chemical properties, (c) mechanical properties, and (d) thermal properties of the composite materials for manufacturing the at least one molded part based on the design requirement.

In an embodiment, the step of performing, via a multiscale modeling technique executed by the one or more hardware processors, thermo chemical analysis on one or more portions of the at least one molded part is preceded by setting one or more manufacturing process parameters based on the design requirement.

In an embodiment, the thermo chemical analysis is performed on the one or more various portions of the at least one molded part to analyze cure kinetics of the at least one molded part.

The one or more hardware processors are further configured for execution of the instructions to analyze the determined residual stresses and one or more determined deformation profiles to determine one or more modifications in at least one of (i) design of the at least one molded part, (ii) a manufacturing process and one or more manufacturing process parameters associated thereof, and (iii) the composite materials.

Value associated with the determined residual stresses and the one or more determined deformation profiles are optimized based on the one or more determined modifications. In other words, the optimization of the one or more determined deformation profiles can be performed using the multiscale modeling technique to improve the quality of the structure and its design.

In yet another aspect, there are provided one or more non-transitory machine-readable information storage mediums comprising one or more instructions which when executed by one or more hardware processors cause for determining deformation profiles and residual stress in molded parts having composite materials by obtaining at least one molded part based on a design requirement, wherein the at least one molded part comprises composite materials; creating, via a geometric Computer-Aided Design (CAD) modeling technique executed by the one or more hardware processors, a geometry model of the at least one molded part; obtaining, for the created geometry model, one or more constituent properties of the composite materials used for the at least one molded part; performing, via a multiscale modeling technique executed by the one or more hardware processors, thermo chemical analysis on one or more portions of the at least one molded part to obtain one or more curing profiles at the one or more portions by using the one or more constituent properties, wherein the one or more curing profiles are obtained by incrementally applying one or more temperature profiles on the one or more portions of the at least one molded part, and wherein the one or more curing profiles comprise (i) one or more levels of degree of cure and (ii) one or more updated constituent properties; and performing, via the multiscale modeling technique executed by the one or more hardware processors, thermo mechanical analysis on the one or more portions of the at least one molded part to determine residual stresses and one or more deformation profiles pertaining to the one or more portions of the at least one molded part based on the one or more curing profiles.

In an embodiment, wherein the geometry model comprises at least one of (i) one or more geometry properties and (ii) one or more material properties pertaining to manufacturing of the at least one molded part based on the design requirement. In an embodiment, the one or more geometry properties comprise at least one of (a) shape, (b) size, (c) ply thickness, (d) stacking sequence, and (e) an orientation of the composite materials. In an embodiment, the one or more material properties comprise at least one of (a) physical properties, (b) chemical properties, (c) mechanical properties, and (d) thermal properties of the composite materials for manufacturing the at least one molded part based on the design requirement.

In an embodiment, the step of performing, via a multiscale modeling technique executed by the one or more hardware processors, thermo chemical analysis on one or more portions of the at least one molded part is preceded by setting one or more manufacturing process parameters based on the design requirement.

In an embodiment, the step of performing thermo chemical analysis one or more various portions of the at least one molded part comprises analyzing cure kinetics of the at least one molded part.

The instructions further cause the one or more hardware processors to analyze the determined residual stresses and one or more determined deformation profiles to determine one or more modifications in at least one of (i) design of the at least one molded part, (ii) a manufacturing process and one or more manufacturing process parameters associated thereof, and (iii) the composite materials.

Value associated with the determined residual stresses and the one or more determined deformation profiles are optimized based on the one or more determined modifications. In other words, the optimization of the one or more determined deformation profiles can be performed using the multiscale modeling technique to improve the quality of the structure and its design.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 6A depicts residual stresses pertaining to the one or more portions of the at least one molded part being determined based on the one or more curing profiles, in accordance with an embodiment of the present disclosure.

FIG. 6B depicts a deformation profile pertaining to the one or more portions of the at least one molded part being determined based on the one or more curing profiles, in accordance with an embodiment of the present disclosure.

DETAILED DESCRIPTION

Figure 1:
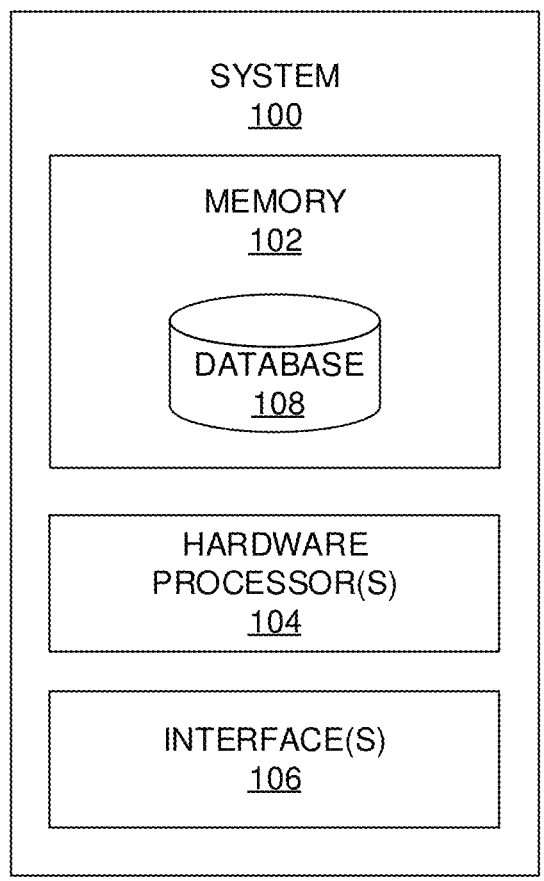
FIG. 1 depicts an exemplary block diagram of a system for determining deformation profiles and residual stresses in molded parts having composite materials, in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments.

Composites are increasingly being used in aerospace, energy, defense and automotive sectors due to its high specific strength and stiffness. This improved performance is dependent on the mechanical properties of reinforcements (such as fibers or other inclusions like particles), and matrix (such as polymer resin, ceramic or metals) and their interaction with each other. In fiber reinforced polymer composites, fiber architecture is tailored to achieve these properties and polymer resin binds together the fiber architecture and transfer the load between the fibers effectively. The properties of resin and fiber-resin interface is highly dependent on curing of matrix during manufacturing. These composites are manufactured by RTM (resin transfer molding), VARTM (vacuum assisted resin transfer molding), hand layup, etc. and then cured in autoclave. In all these manufacturing processes, cure kinetics of resin plays critical role in the part dimensional accuracy and final structural behaviour. Heat is applied to the part to start the cure process of resin which in turn creates an exothermic reaction. This exponentially accelerates the curing process and leads to high temperature gradients especially in thick composites. Also, faster cure rates in complex geometrical parts can lead to internal thermal runaway conditions with the end part resulting with matrix cracks. It generates high residual stresses which cause warpage resulting in poor dimensional fidelity when parts are relieved from molds.

The study of manufacturing effects due to curing requires to analyze the local heat generation due to cure kinetics of the resin as well as heat conduction between fiber and resin in composites. Therefore, in composites, curing of resin is affected by the type of fibers, its architecture, volume fraction, etc. Additionally, depending on volume of parts produced and cycle time required, various parameters of curing process such as time dependent temperature cycle applied to mold, vacuum inside the mold and curing agents are changed accordingly. This dependency of material properties and dimensional stability on multiple types of fibers (carbon, glass, etc.), their complicated architectures and cure process parameters is usually calculated by experimentation and curing process parameters are typically decided by professional(s) based on their experience in a typical industrial manufacturing set up.

Currently, the product life cycle of various products has become short and new/incremental updates in products becoming too frequent. That demands significant reduction in product development time and cost. Prototyping stage with its multiple design choices is being carried out experimentally. Additionally, there are high number of prototypes with frequent modifications due to manufacturing effects which makes product development expensive in terms of cost and time. Through computational methods, the manufacturing effects can be modeled and included in the product design process at the initial stages itself. The effects of manufacturing process (residual stresses, damage, deformation or warpages) can also be passed on to various analysis such as structural, modal, reliability and many more to accurately capture state of stress under variety of design loads and boundary conditions. This helps to effectively realize the full potential of composite materials compared to general practice of adding safety margins for manufacturing effects without any detailed analysis.

Composite materials are multi-material system and hierarchical in nature. Part(s) made up of laminated fiber reinforced polymer composite materials has/have mechanical, chemical, thermal and/or physical behaviour which depends on ply-orientation, layup sequence at meso scale or fiber-matrix interaction at microscale or nano particles embedded in matrix at nano scale level. Thus, different physical phenomenon interacts with each other at different length scales. It is difficult to study or include all these interactions at any one level and thus warrants a multiscale framework. The effects of curing start at the microlevel, accumulate and eventually reflects at bulk level. These effects are generally measured through experiments only at bulk level. Large amount of additional test needs to be carried out to optimize manufacturing parameters to yield desired levels of residual stresses and deformations. These test needs to be carried out every time when there is change in material system. These expensive and time-consuming tests can be replaced with computational approaches having multiscale framework as mentioned in the present disclosure. Additionally, computational approaches can help in analysing the internal stresses and strains in detail which may not be possible thorough physical experiments.

Embodiments of the present disclosure provide systems and methods that implement simulation techniques for determining deformation profiles and residual stress in molded parts having composite material. The composite parts are modeled at the macro level and are connected through multiple detailed mesoscale geometric models to the lowest microscale geometric models (also called as representative volume element or RVE) that captures the heterogenous nature of the composite materials. A cure kinetics model is then implemented between these length scales to perform thermo-chemical and subsequent thermo-mechanical analysis.

Material properties used in composites design process are measured in a controlled laboratory conditions which follows certain test standards such as ASTM, ISO, etc. These properties may not be extended in designing large complex parts as they do not consider the real manufacturing processes. The present disclosure performs these analysis from the individual properties of fibers and resin provided by vendors which are more reliable and easily available and refraining any additional experiments to be carried out by manufacturer, exploring more variations/combinations of fiber and resin to optimize the product performance wherein manufacturing effects can be analysed quickly through computational approach instead of physical experiments.

Conventionally, researchers have outlined the generally categorized multiscale frameworks into three types as a) Hierarchical b) Concurrent and c) Semi-concurrent. In the hierarchical multiscale framework, lower length scale models are analysed to provide necessary input to compute behavior at higher length scale models. The required inputs are homogenized which provide only homogenized properties without retaining the lower length scale information post-homogenization. In concurrent multiscale framework, the part being analyzed is discretized into multiple sub-regions. Only the critical sub-regions are analysed through direct lower length scale modeling. The information between the length-scales is transferred through modeling transitional interface.

In semi-concurrent multiscale framework as described in the present disclosure, higher length scale model depends on lower length scale models for accessing information at each iteration. Thus, the dynamic interactions between different length scales act as constitutive relationship for material modelling and allows to retain lower length scale information throughout the analysis.

The framework used in the systems and methods of the present disclosure is shown in various figures as illustrative examples. The macro and micro scale, both models have been analyzed through finite element method (FEM). In the present disclosure, thermo-chemical analysis is carried out and the time history of temperature and degree of cure is forwarded to structural analysis (also referred as thermal mechanical analysis). The semi-concurrent multiscale framework is used for both, thermo-chemical and structural analysis. The independent microscale analysis is carried at each integration point of macro scale part. The microscale level model evolves through each timesteps according to the inputs coming from macro level and the information of this evolving microscale fields is retained throughout the analysis. For thermo-chemical study, temperature information goes to microscale analysis. The heat transfer analysis is carried out on microscale model to get the homogenized conductivity and cure kinetics analysis is carried out to get the homogenized degree of cure. These two homogenized properties are returned to macroscale level analysis at each integration point and state of microscale representative elementary volume (RVE) is stored for the next timestep. In thermo mechanical analysis, the temperature and degree of cure information passed on to microscale analysis. The mechanical properties of resin are dependent on the degree of cure and hence the linear perturbation analysis is carried out at microscale level to get the homogenized mechanical properties which will be used to form constitutive matrix at macroscale level for each integration point. The additional structural analysis is carried out at microscale level to get the homogenized stress developed due to cure shrinkage and thermal effects. At the end of the analysis, the final output is residual stress distribution and deformation profile.

Referring now to the drawings, and more particularly to FIGS. 1 through 8, where similar reference characters denote corresponding features consistently throughout the figures, there are shown preferred embodiments and these embodiments are described in the context of the following exemplary system and/or method.

FIG. 1 depicts an exemplary block diagram of a system 100 for determining deformation profiles and residual stresses in molded parts having composite materials, in accordance with an embodiment of the present disclosure. The system 100 may also be referred as 'analysis system' and may be interchangeably used hereinafter. In an embodiment, the system 100 includes one or more hardware processors 104, communication interface device(s) or input/output (I/O) interface(s) 106 (also referred as interface(s)), and one or more data storage devices or memory 102 operatively coupled to the one or more hardware processors 104. The one or more processors 104 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, a database 108 is comprised in the memory 102, wherein the database 108 comprises information, for example, structure information of molded parts based on design requirement. The information stored in the database 108 may further comprise geometric computer-aided design (CAD)/geometry model of the at least one molded part, constituent properties of composite materials used for the at least one molded part, one or more manufacturing process parameters required for setting for performing thermal chemical analysis and thermal mechanical analysis, outputs of each of the thermal chemical analysis and thermal mechanical analysis. More specifically, the memory 102 further comprises outputs of the thermal chemical analysis and thermal mechanical analysis, wherein output of the thermal chemical analysis include one or more curing profiles comprising (i) one or more levels of degree of cure and (ii) one or more updated constituent properties and the like. Output of the thermal mechanical analysis include residual stresses and one or more deformation profiles pertaining to the one or more portions of the at least one molded part based on the one or more curing profiles and the like.

In an embodiment, the memory 102 may store (or stores) one of more techniques. For instance, one or more finite element analysis technique(s) such as multiscale modeling technique (encompassing thermal chemical analysis, thermal mechanical analysis) and the like may be comprised in the memory 102 and executed accordingly to perform one or more methodologies described hereinafter. Further the memory 102 may comprise geometric CAD model for geometry model creation of the at least one molded part. The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

Figure 2:
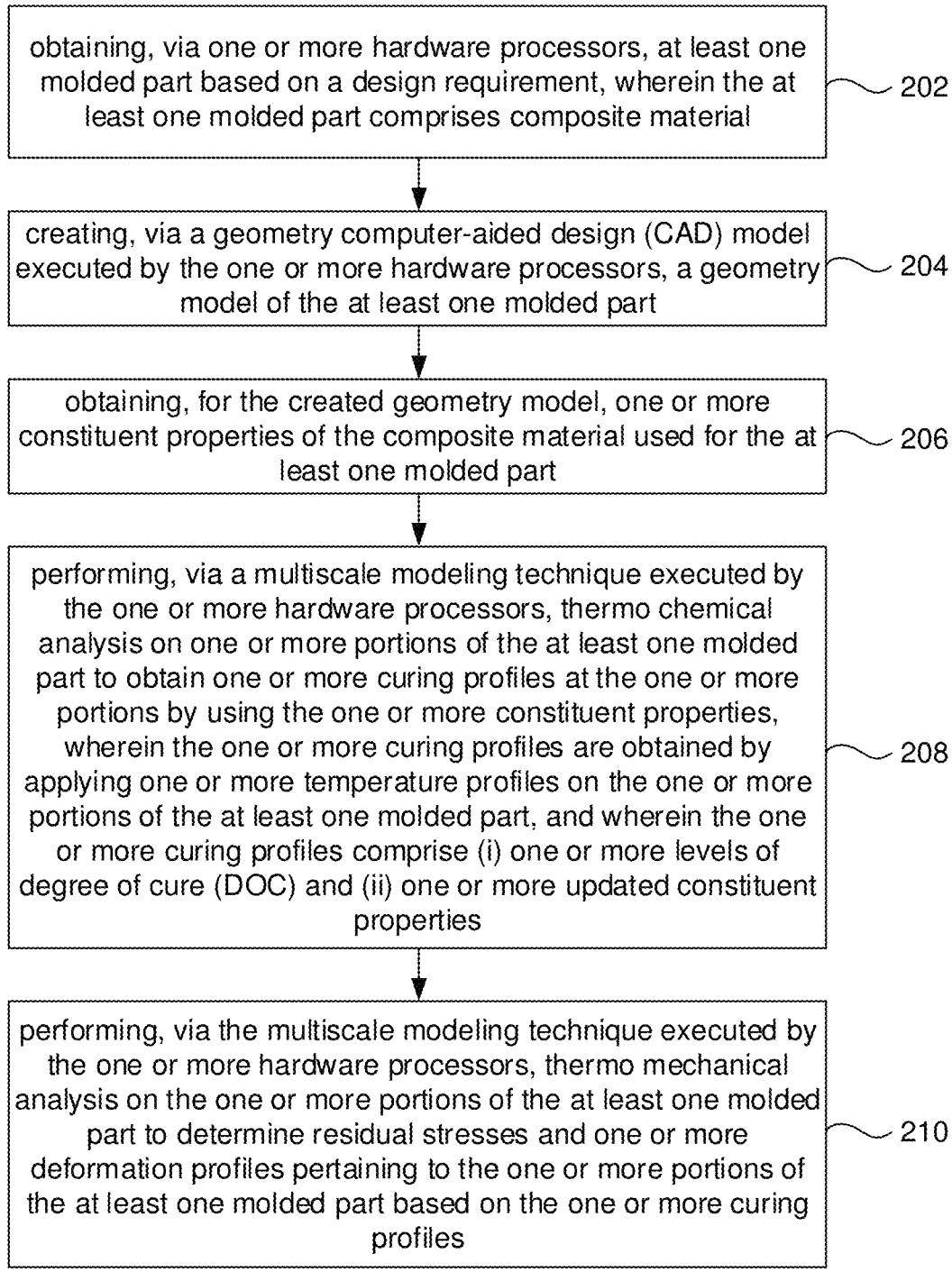
FIG. 2 depicts an exemplary flow chart for determining deformation profiles and residual stresses in the molded parts having the composite materials using the system of FIG. 1, in accordance with an embodiment of the present disclosure.

FIG. 2, with reference to FIG. 1, depicts an exemplary flow chart for determining deformation profiles and residual stresses in molded parts having composite materials using the system 100 of FIG. 1, in accordance with an embodiment of the present disclosure. In an embodiment, the system(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to components of the system 100 of FIG. 1, the flow diagram as depicted in FIG. 2 and FIGS. 3 through 8.

Figure 3:
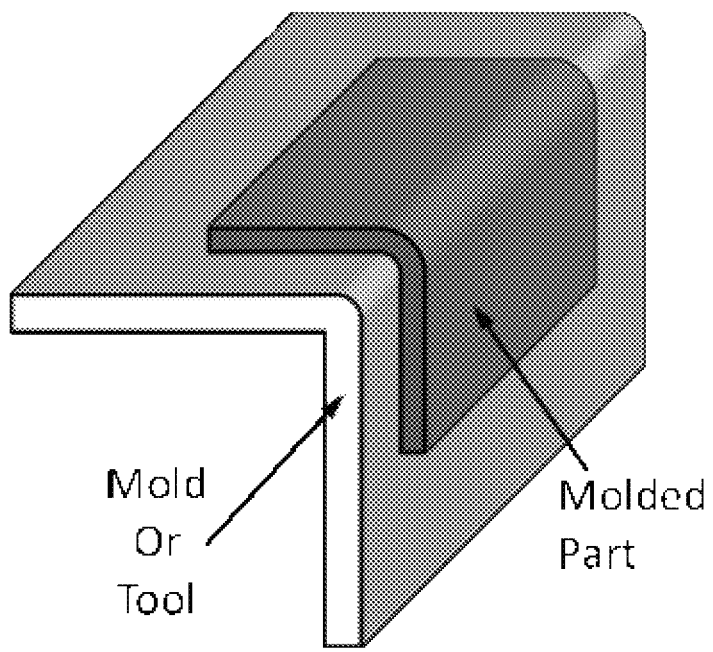
FIG. 3 depicts a design structure comprising at least one molded part being cured on mold, in accordance with an embodiment of the present disclosure.

In an embodiment, at step 202 of the present disclosure, the one or more hardware processors 104 obtain at least one molded part based on a design requirement. The expression 'molded part' may also be referred as 'molded structure' and can be interchangeably used hereinafter. In an embodiment, the at least one molded part comprises of composite materials. FIG. 3, with reference to FIGS. 1 through 2, depicts a design structure comprising the at least one molded part being cured on mold, in accordance with an embodiment of the present disclosure. The design of structure may include a mold, or a tool as shown in FIG. 3. In the example of the at least one molded part depicted in FIG. 3, details of composite material are illustrated by way of non-construing example below:

1. Carbon Fiber Reinforced Polymer (CFRP) composite
2. volume fraction of fiber is 0.66
3. Type: Continuous Unidirectional layup (all 0° plies)
4. Reinforcement: Carbon fiber
5. Resin: Epon 862 and Epikure 9553

Figure 4A:
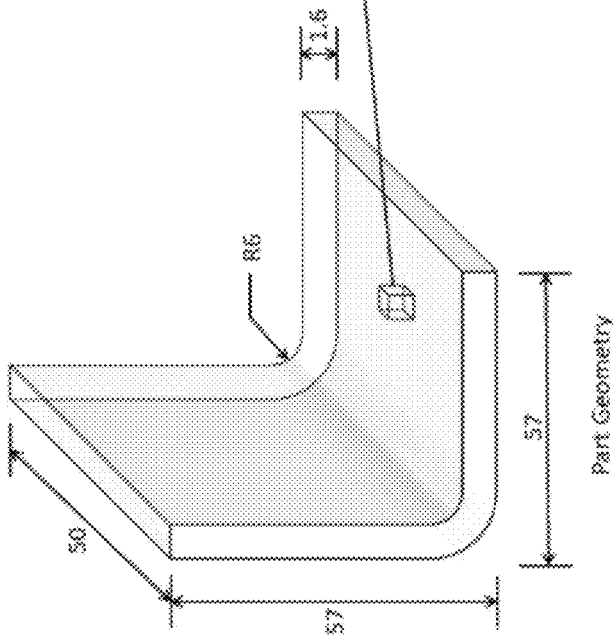
FIG. 4A depicts a geometry model of the at least one molded part created using a geometric computer-aided design (CAD) model comprised in the system of FIG. 1, in accordance with an embodiment of the present disclosure.
Figure 4B:
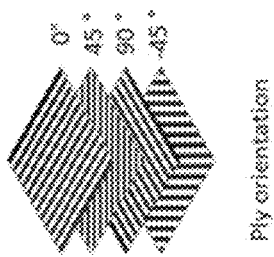
FIG. 4B depicts an overall thickness and individual ply thickness of the at least one molded part, in accordance with an embodiment of the present disclosure.
Figure 4C:
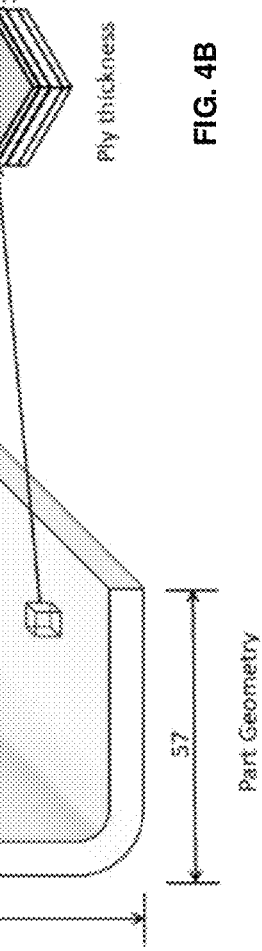
FIG. 4C depicts a ply stacking sequence and an orientation of the composite materials of the at least one molded part, in accordance with an embodiment of the present disclosure.

In an embodiment of the present disclosure, at step 204, the one or more hardware processors 104 create a geometry model of the at least one molded part using a geometric computer-aided design (CAD) model (comprised in the memory 102). In an embodiment, the expression 'geometric computer-aided design (CAD) model' may also be referred as 'geometric computer-aided design (CAD) modeling technique' and interchangeably used hereinafter. FIG. 4A, with reference to FIGS. 1 through 3, depicts a geometry model of the at least one molded part created using the geometric CAD model comprised in system 100 of FIG. 1, in accordance with an embodiment of the present disclosure. Dimensions in FIG. 4A are in millimeter. R6 denotes radius of 6 mm at corner. FIG. 4B, with reference to FIGS. 1 through 4A, depicts an overall thickness and individual ply thickness of at least one molded part in accordance with an embodiment of the present disclosure. FIG. 4C, with reference to FIGS. 1 through 4B, depicts a ply stacking sequence and an orientation of the composite materials of the at least one molded part, in accordance with an embodiment of the present disclosure. In an embodiment, the geometry model comprises at least one of (i) one or more geometry properties and (ii) one or more material properties pertaining to manufacturing of the at least one molded part based on the design requirement. The one or more geometry properties comprise at least one of (a) shape (L-channel shaped), (b) size (refer FIG. 4A), (c) ply thickness (refer FIG. 4B), (d) stacking sequence (refer FIG. 4C), (e) an orientation (e.g., 0°, 45°, 90°, -45°—refer FIG. 4C)) of the composite material, and the like, in one example embodiment. The one or more material properties comprise at least one of (a) physical, (b) chemical, and (c) mechanical properties, and (d) thermal properties of the composite material for manufacturing of the at least one molded part based on the design requirement. It is to be understood by a person having ordinary skill in the art or person skilled in the art that any temperature control technique(s) for applying any temperature profiles (e.g., low temperature, high temperature and the like) on mold can be utilized.

In an embodiment of the present disclosure, at step 206, the one or more hardware processors 104 obtain, for the created geometry model, one or more constituent properties of the composite material used for the at least one molded part. For example, the one or more constituent properties of the above composite material, comprise but are not limited to, physical properties (e.g., density), chemical properties (e.g., degree of cure, heat of reaction, shrinkage rate and the like), thermal properties (e.g., thermal conductivity, specific heat, and the like), and mechanical properties (e.g., Young's modulus, p-wave modulus, Shear modulus, Poisson's ratio, coefficient of thermal expansion and the like). In an embodiment of the present disclosure, prior to performing multiscale analysis, one or more manufacturing process parameters are set or finalized based on the design requirement. For instance, the one or more manufacturing process parameters considering the above example, may include, number of cycles, holding temperature (° C.), holding time (in minutes), heating rate (° C./minute), cooling rate (° C./minute), and the like through which a single step temperature profile is set for the molded part. The temperature is increased from room temperature to holding temperature with a given heating rate. It is held at that temperature for period of given holding time and again decreased to room temperature with given cooling rate. Output parameters include residual stress (MPa), deformation angle (degree) and the like. Initially, cycles such as cycle A (or cycle 1) is set. Holding temperature could be set to 62° C., holding time could be set as 42 minutes, heating rate could be set to 12° C./minute, cooling rate may be set to 12° C./minute, residual stress may be outputted as 93.72 MPa, and deformation angle of 0.66 degree may be outputted.

Figure 5A:
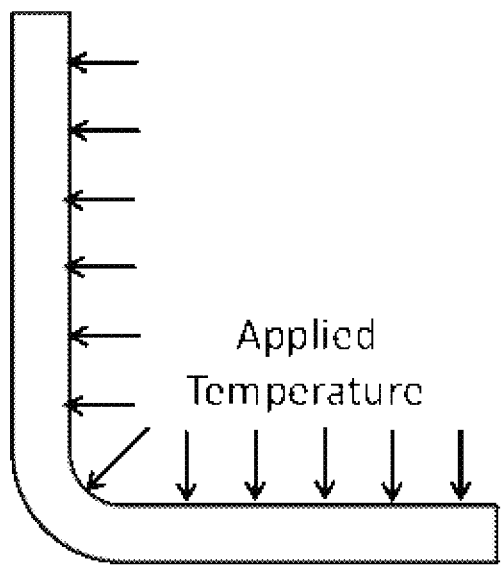
FIG. 5A depicts thermal chemical analysis being performed by applying one or more temperature profiles on (or at) the one or more portions of the at least one molded part using the multiscale modeling technique comprised in the system of FIG. 1, in accordance with an embodiment of the present disclosure.
Figure 5B:
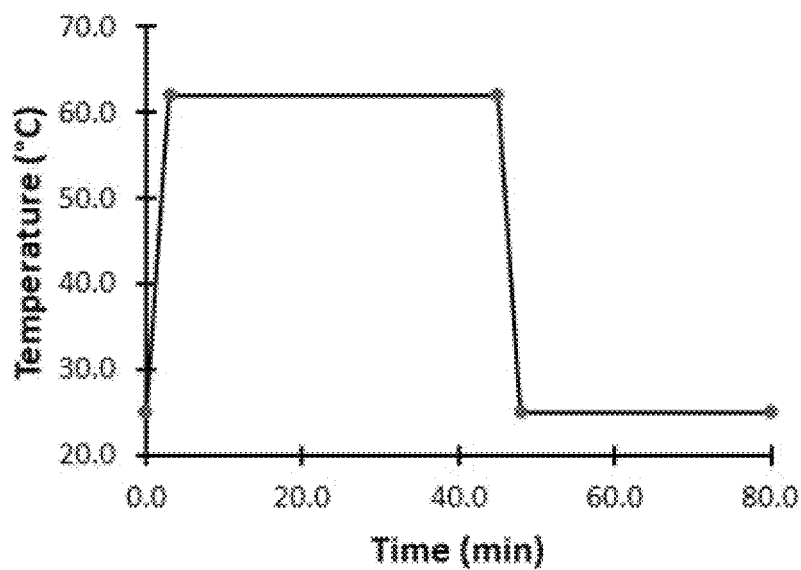
FIG. 5B depicts a graphical representation of the one or more temperature profiles versus time wherein the one or more temperature profiles are applied to the one or more portions of the at least one molded part, in accordance with an embodiment of the present disclosure.
Figure 5C:
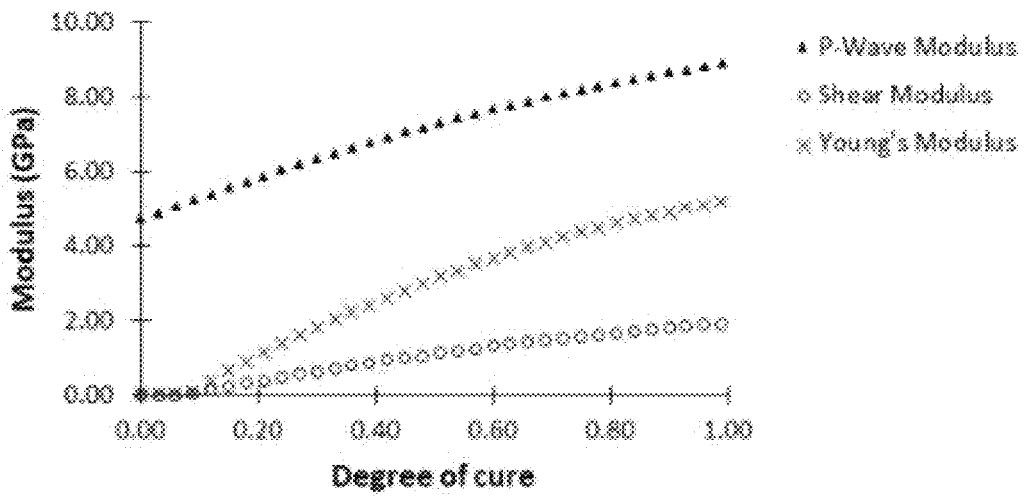
FIG. 5C depicts a graphical representation of one or more curing profiles comprising (i) the one or more levels of degree of cure and (ii) one or more updated constituent properties, in accordance with an embodiment of the present disclosure.
Figure 5D:
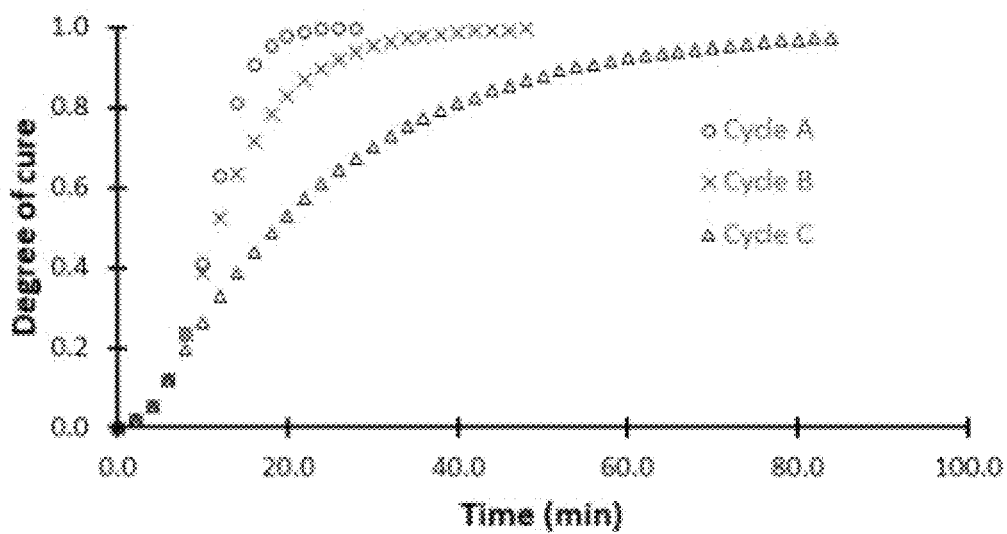
FIG. 5D depicts an analysis of cure kinetics of the at least one molded part having composite materials, using the system of FIG. 1, in accordance with an embodiment of the present disclosure.

Upon setting the above manufacturing process parameters, in an embodiment of the present disclosure, at step 208, the one or more hardware processors 104 thermo chemical analysis on one or more portions of the at least one molded part to obtain one or more curing profiles (also referred as cure profiles and interchangeably used herein) at the one or more portions by using the one or more constituent properties. In the present disclosure, the one or more hardware processors 104 utilize the multiscale modeling technique comprised in the memory 102 to perform the thermo chemical analysis. The thermal chemical analysis is performed by incrementally applying one or more temperature profiles on (or at) the one or more portions of the at least one molded part. FIG. 5A, with references to FIGS. 1 through 4A, depicts thermal chemical analysis being performed by applying one or more temperature profiles on (or at) the one or more portions of the at least one molded part using the multiscale modeling technique comprised in the system 100 of FIG. 1, in accordance with an embodiment of the present disclosure. FIG. 5B, with reference to FIGS. 1 through 5A, depicts a graphical representation of the one or more temperature profiles versus time wherein the one or more temperature profiles are applied to the one or more portions of the at least one molded part, in accordance with an embodiment of the present disclosure. As can be depicted in FIG. 5B, the temperature profiles are varied with time and applied across the one or more portions of the at least one molded part. The thermal chemical analysis results in obtaining/generation of the one or more curing profiles. In an embodiment of the present disclosure, the one or more curing profiles comprise (i) one or more levels of degree of cure and (ii) one or more updated constituent properties. FIG. 5C, with reference to FIGS. 1 through 5B, depicts a graphical representation of the one or more curing profiles comprising (i) the one or more levels of degree of cure and (ii) the one or more updated constituent properties, in accordance with an embodiment of the present disclosure. In FIG. 5C, curing profile (or degree of cure) for updated constituent properties is shown wherein the updated constituent properties in this case are Young modulus, p-wave modulus, and Shear modulus. In an embodiment, the step of performing thermo chemical analysis one or more various portions of the at least one molded part comprises analyzing cure kinetics of the at least one molded part. The analysis of cure kinetics of the at least one molded part is depicted in FIG. 5D. More specifically, FIG. 5D, with reference to FIGS. 1 through 5C, depicts an analysis of cure kinetics of the at least one molded part having composite materials, using the system 100 of FIG. 1, in accordance with an embodiment of the present disclosure. Below description on cure kinetics is provided for better understanding of the embodiments of the present disclosure provided and described herein.

Matrix system used in polymer composite materials is typically a mixture of resin and hardener. Catalysts are also added in hardener to accelerate the cure process. During curing, chemical reactions occurs and it results into cross-linking of monomers into various chains and subsequently these chains link with each other to create large network. Ultimately the whole system gets insoluble solid form at the end of cure process.

Figure 7:
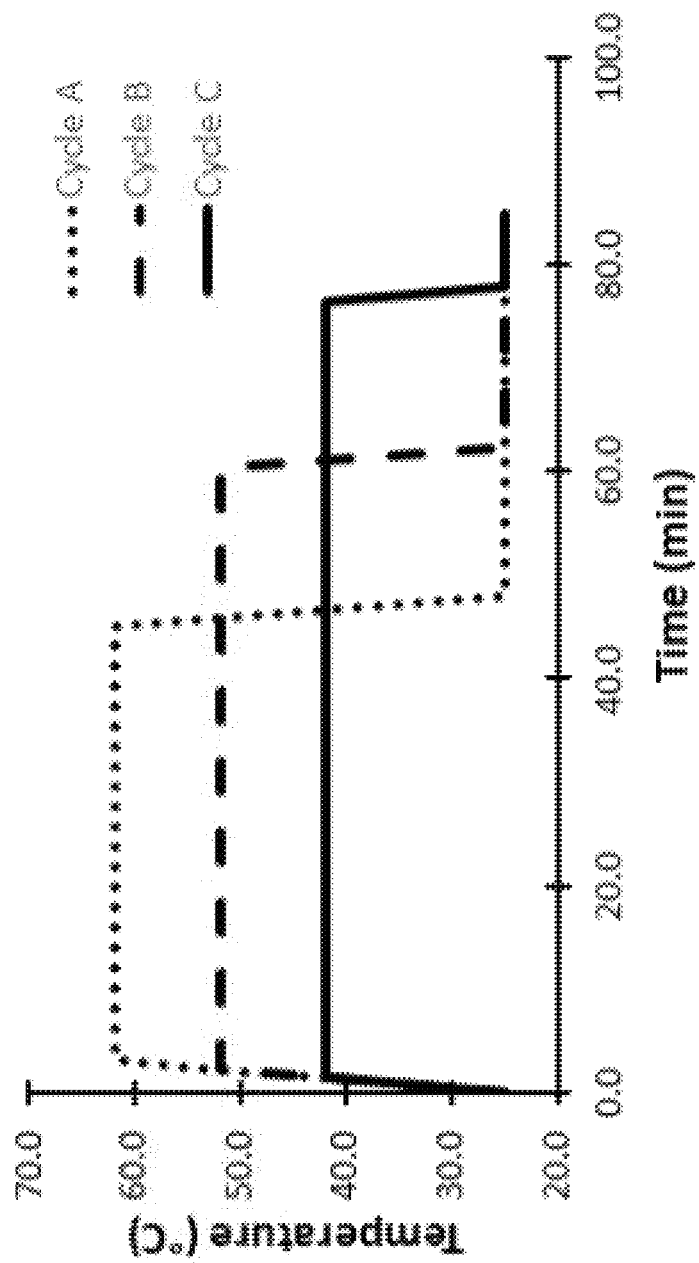
FIG. 7 depicts a graphical representation illustrating various updated temperature profiles to be applied (or being applied) on portions of the at least one molded part having composite materials, in accordance with an embodiment of the present disclosure.

Curing is an exothermic process and the progress or extent of curing process is defined by degree of cure. The degree of cure (ø) (DOC) at specific time is defined as the ratio of heat generated till that time to the total heat generated during the curing process. It can be measured by placing a sample of resin or polymer composite materials in digital scanning calorimeter (DSC) and the heat generated at maintained constant temperature is measured. Other material properties characterization during curing can be obtained using concurrent Raman and Brillouin light scattering. The curing process is combination of local heat generation due to curing and heat conduction in matrix and fibers as well. The first law of thermodynamics is used to form a coupled nonlinear partial differential equation for analysis of the cure process. The temperature profile for the following finite element analysis (FEA) is shown in FIGS. 5B and 7. Initially the sample is kept at xK (e.g., say room temperature) and then temperature is increased linearly up to yK (e.g., say holding temperature) with given heating rate and maintain it for given holding time. Temperature is then reduced to room temperature linearly according to given cooling rate and kept at that level till it is completely cured. As stated earlier, mechanical properties of epoxy evolve during curing process which can be measured experimentally. Initially epoxy-curing agent system is in liquid state. Therefore, the shear modulus is nearly zero and acts like a viscous fluid till gelation. Initially very small non-zero stiffness is taken to avoid singularities in FEA. The cure shrinkage of epoxy is considered 2% in the present study and assumed to be linearly varying with DOC. Bi-linear relationship is found between cure shrinkage and degree of cure in experiments.

In an embodiment of the present disclosure, at step 210, the one or more hardware processors 104 perform, via the multiscale modeling technique, thermo mechanical analysis on the one or more portions of the at least one molded part to determine residual stress and one or more deformation profiles pertaining to the one or more portions of the at least one molded part based on the one or more curing profiles. It is to be understood by a person having ordinary skill in the art or person skilled in the art that the step 208 and 210 can be performed concurrently or sequentially, wherein the temperature history is taken as output of 208 to perform step 210. FIG. 6A, with reference to FIGS. 1 through 5D, depicts residual stresses pertaining to the one or more portions of the at least one molded part being determined based on the one or more curing profiles, in accordance with an embodiment of the present disclosure. FIG. 6B, with reference to FIGS. 1 through 6A, depicts a deformation profile pertaining to the one or more portions of the at least one molded part being determined based on the one or more curing profiles, in accordance with an embodiment of the present disclosure. The hardware processors 104 further analyze the determined residual stress and one or more determined deformation profiles to determine one or more modifications in at least one of (i) design of the at least one molded part, (ii) the one or more manufacturing process parameters associated thereof, and (iii) the composite material. For instance, the modifications may be carried out in temperature profiles wherein varied updated temperature profiles are applied during thermal chemical analysis on various portions of the at least one molded part with reference to time for change in residual stress. Similarly, values associated with the one or more manufacturing process parameters may be modified or set to another value to optimize deformation profiles and to improve overall structure and design of the at least one molded part. FIG. 7, with reference to FIGS. 1 through 6B, depicts a graphical representation illustrating various updated temperature profiles to be applied (or being applied) on portions of the at least one molded part having composite materials, in accordance with an embodiment of the present disclosure. Below table (Table 1) depicts modifications to manufacturing process parameters based on analysis being performed on the determined residual stress and one or more determined deformation profiles, in accordance with an embodiment of the present disclosure.

TABLE 1

| | Process parameters | | | | Output parameters (for L-channel shaped molded part) | |
|---|---|---|---|---|---|---|
| Cycle | holding temperature (° C.) | holding time (in minutes) | heating rate (° C./ minute) | cooling rate (° C./ minute) | Average residual stress at corner (MPa) | deformation angle (degree) |
| A | 62 | 42 | 12 | 12 | 93.72 | 0.66 |
| B | 52 | 58 | 12 | 12 | 89.43 | 0.52 |
| C | 42 | 75 | 12 | 12 | 87.49 | 0.48 |

In Table 1, assuming the initial manufacturing process parameters set were cycle type as cycle A, holding temperature set to 62° C., holding time set as 42 minutes, heating rate set to 12° C./minute, cooling rate set to 12° C./minute, residual stress is outputted as 93.72 MPa, and deformation angle of 0.66 degree was outputted. The modifications to manufacturing process parameters based on the determined (outputted) residual stress and (outputted) deformation profiles may result in change in cycles from cycle A to cycle B and from cycle B to cycle C and the holding temperature set to 62° C. was modified to 52° C. during cycle B and then set to 42° C. for cycle C. Similarly, initial holding time was set as 42 minutes during cycle A and based on the determined (outputted) residual stress and (outputted) deformation profiles, holding time was modified to 58 minutes during cycle B and further modified to 75 minutes during cycle C. However, the initial residual stress of 93.72 MPa got corrected to generate an updated output of 89.43 MPa and 87.49 MPa for cycles B and C respectively. Likewise, the initial deformation angle that was outputted as 0.66 degree got updated to 0.52 and 0.48 degree for cycles B and C respectively. Therefore, the value associated with the determined residual stresses and the one or more determined deformation profiles are optimized based on the one or more determined modifications.

Figure 8:
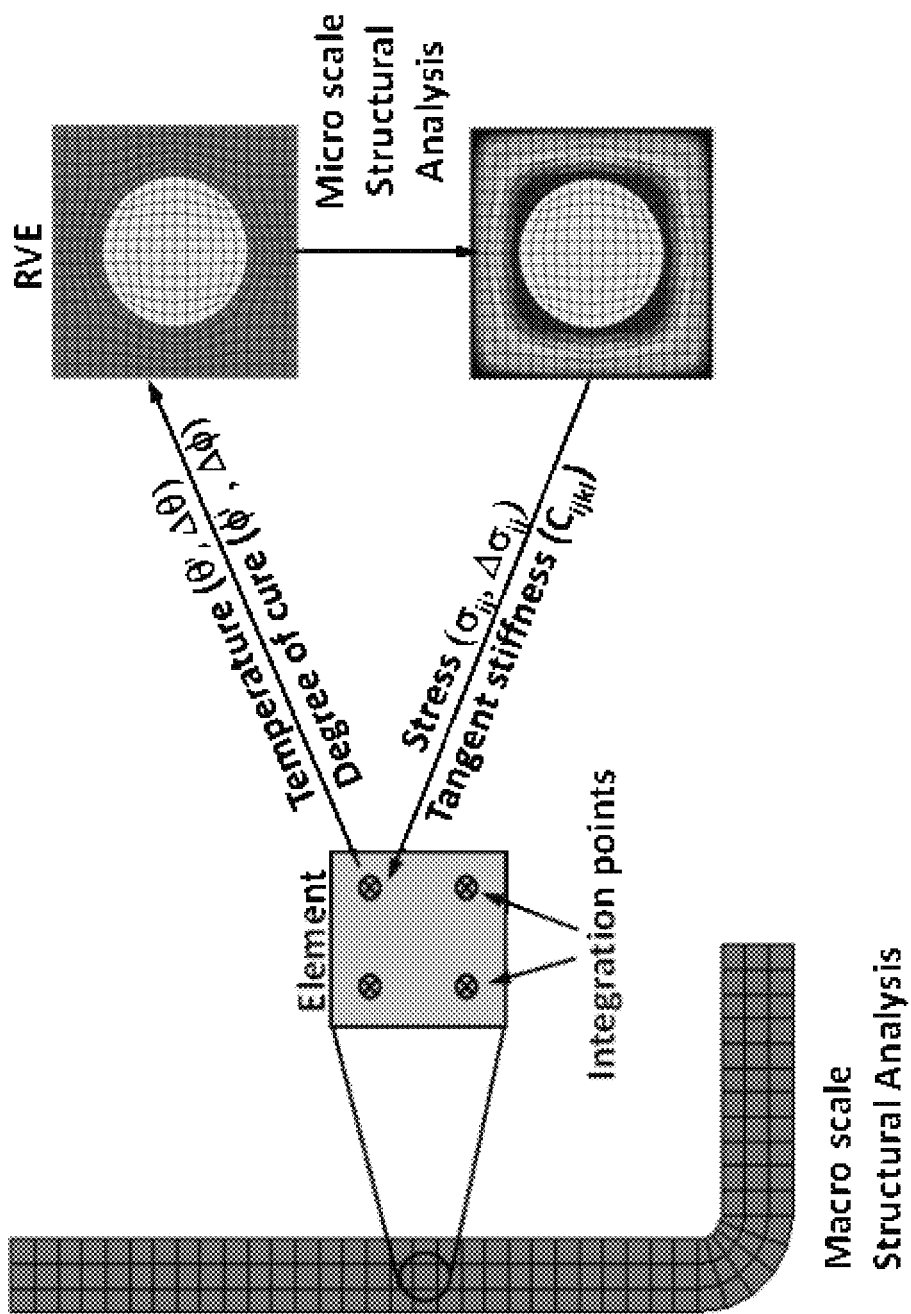
FIG. 8 depicts a schematic representation of a simulation technique as implemented by the system of FIG. 1 wherein multiscale analysis was performed for determining deformation profiles and residual stresses in the at least one molded part having composite materials, in accordance with an embodiment of the present disclosure.

FIG. 8, with reference to FIGS. 1 through 7, depicts a schematic representation of a simulation technique as implemented by the system 100 of FIG. 1 wherein multiscale analysis was performed for determining deformation profiles and residual stresses in the at least one molded part having composite materials, in accordance with an embodiment of the present disclosure.

In the conventional approaches and systems, manufacturing process parameters are still decided manually and empirically based on previous design iterations. Extensive experiments are still carried out to characterize and capture the microscale effects at bulk level. Even more prototypes of the designed product are required to optimize process parameters of manufacturing process to reduce residual stresses and deformations in the molded part made up of composite materials. Any modification in material system such as change in volume fraction of fibers, change in fiber architecture, change in ply orientation or ply stack-up warrants physical experiments to be carried out again. The present disclosure describes the computational approach with multiscale method which captures different phenomenon occurring at different length scales and their effects at bulk level through scale bridging. Unlike conventional approaches wherein complete experimental development involving coupon level testing of composites is required, embodiments of the present disclosure replace this requirement wherein present disclosure requires only a limited number of basic experiments of the constituents of composites. Present disclosure reduces cost and time related to repetitive physical experimental characterization needed in case of changes in the material system as mentioned above. Also, the imperfections due to limitations of manufacturing processes such as different volume fraction in different plies (effect of bleeder in resin transfer molding (RTM)), dry or matrix rich regions within same plies or parts can also be included in the analysis without major modifications in the approach.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:
    obtaining, via one or more hardware processors, at least one molded part based on a design requirement, wherein the at least one molded part comprises composite materials;
    creating, via a geometric computer-aided design (CAD) model executed by the one or more hardware processors, a geometry model of the at least one molded part, wherein the at least one molded part is modeled at macro level and connected through multiple mesoscale geometric models and microscale geometric models that captures heterogenous nature of the composite materials;
    obtaining, for the created geometry model, one or more constituent properties of the composite materials used for the at least one molded part;
    performing, via a multiscale modeling technique executed by the one or more hardware processors, thermo chemical analysis on one or more portions of the at least one molded part to obtain one or more curing profiles at the one or more portions by using the one or more constituent properties, wherein the one or more curing profiles are obtained by applying one or more temperature profiles on the one or more portions of the at least one molded part, wherein the thermo chemical analysis on the one or more portions of the at least one molded part comprises analyzing cure kinetics of the at least one molded part, and wherein the one or more curing profiles comprise (i) one or more levels of degree of cure (DOC) and (ii) one or more updated constituent properties; and
    performing, via the multiscale modeling technique executed by the one or more hardware processors, thermo mechanical analysis on the one or more portions of the at least one molded part to determine residual stresses and one or more deformation profiles pertaining to the one or more portions of the at least one molded part based on the one or more curing profiles,
    wherein a semi-concurrent multiscale framework is used, for both of the thermo-chemical analysis and the thermo mechanical analysis, where the at least one molded part at the macro level depend on the microscale geometric models for accessing a micro scale information at each iteration such that a dynamic interactions between varying levels acts as constitutive relationship for material modelling and allows to retain the micro scale information throughout the thermo chemical analysis and the thermo mechanical analysis.

2. The processor implemented method as claimed in claim 1, wherein the geometry model comprises at least one of (i) one or more geometry properties and (ii) one or more material properties pertaining to manufacturing of the at least one molded part based on the design requirement, wherein the one or more geometry properties comprise at least one of (a) shape, (b) size, (c) ply thickness, (d) stacking sequence, and (e) an orientation of the composite materials, and wherein the one or more material properties comprise at least one of (a) physical, (b) chemical, (c) mechanical properties, and (d) thermal properties of the composite materials for manufacturing of the at least one molded part based on the design requirement.

3. The processor implemented method as claimed in claim 1, wherein the step of performing, via a multiscale modeling technique executed by the one or more hardware processors, thermo chemical analysis on one or more portions of the at least one molded part is preceded by setting one or more manufacturing process parameters based on the design requirement.

4. The processor implemented method as claimed in claim 1, further comprising analyzing the determined residual stress and one or more determined deformation profiles to determine one or more modifications in at least one of (i) design of the at least one molded part, (ii) a manufacturing process and one or more manufacturing process parameters associated thereof, and (iii) the composite materials.

5. A system, comprising:
a memory storing instructions;
one or more communication interfaces; and
one or more hardware processors coupled to the memory via the one or more communication interfaces, wherein the one or more hardware processors are configured by the instructions to:
obtain at least one molded part based on a design requirement, wherein the at least one molded part comprises composite material;
create, via a geometric computer-aided design (CAD) model executed by the one or more hardware processors, a geometry model of the at least one molded part, wherein the at least one molded part is modeled at macro level and connected through multiple mesoscale geometric models and microscale geometric models that captures heterogenous nature of the composite materials;
obtain, for the created geometry model, one or more constituent properties of the composite material used for the at least one molded part;
perform, via a multiscale modeling technique executed by the one or more hardware processors, thermo chemical analysis on one or more portions of the at least one molded part to obtain one or more curing profiles at the one or more portions by using the one or more constituent properties, wherein the one or more curing profiles are obtained by applying one or more temperature profiles on the one or more portions of the at least one molded part, wherein the thermo chemical analysis on the one or more portions of the at least one molded part comprises analyzing cure kinetics of the at least one molded part, and wherein the one or more curing profiles comprise (i) one or more levels of degree of cure (DOC) and (ii) one or more updated constituent properties; and
perform, via the multiscale modeling technique executed by the one or more hardware processors, thermo mechanical analysis on the one or more portions of the at least one molded part to determine residual stresses and one or more deformation profiles pertaining to the one or more portions of the at least one molded part based on the one or more curing profiles,
wherein a semi-concurrent multiscale framework is used, for both of the thermo-chemical analysis and the thermo mechanical analysis, where the at least one molded part at the macro level depend on the microscale geometric models for accessing a micro scale information at each iteration such that a dynamic interactions between varying levels acts as constitutive relationship for material modelling and allows to retain the micro scale information throughout the thermo chemical analysis and the thermo mechanical analysis.

6. The system of claim 5, wherein the geometry model comprises at least one of (i) one or more geometry properties and (ii) one or more material properties pertaining to manufacturing of the at least one molded part based on the design requirement, wherein the one or more geometry properties comprise at least one of (a) shape, (b) size, (c) ply thickness, (d) stacking sequence, and (e) an orientation of the composite materials, and wherein the one or more material properties comprise at least one of (a) physical, (b) chemical, (c) mechanical properties, and (d) thermal properties of the composite materials for manufacturing of the at least one molded part based on the design requirement.

7. The system of claim 5, wherein the thermo chemical analysis on one or more portions of the at least one molded part based on one or more manufacturing process parameters being set based on the design requirement.

8. The system of claim 5, wherein the one or more hardware processors are further configured to analyze the determined residual stress and one or more determined deformation profiles to determine one or more modifications in at least one of (i) design of the at least one molded part, (ii) a manufacturing process and one or more manufacturing process parameters associated thereof, and (iii) the composite materials.

9. One or more non-transitory machine-readable information storage mediums comprising one or more instructions which when executed by one or more hardware processors cause for determining deformation profiles and residual stress in molded parts having composite materials by:
obtaining at least one molded part based on a design requirement, wherein the at least one molded part comprises composite materials;
creating, via a geometric Computer-Aided Design (CAD) modeling technique executed by the one or more hardware processors, a geometry model of the at least one molded part, wherein the at least one molded part is modeled at macro level and connected through multiple mesoscale geometric models and microscale geometric models that captures heterogenous nature of the composite materials;
obtaining, for the created geometry model, one or more constituent properties of the composite materials used for the at least one molded part;
performing, via a multiscale modeling technique executed by the one or more hardware processors, thermo chemical analysis on one or more portions of the at least one molded part to obtain one or more curing profiles at the one or more portions by using the one or more constituent properties, wherein the one or more curing profiles are obtained by incrementally applying one or more temperature profiles on the one or more portions of the at least one molded part, wherein the thermo chemical analysis on the one or more portions of the at least one molded part comprises analyzing cure kinetics of the at least one molded part, and wherein the one or more curing profiles comprise (i) one or more levels of degree of cure and (ii) one or more updated constituent properties; and
performing, via the multiscale modeling technique executed by the one or more hardware processors, thermo mechanical analysis on the one or more portions of the at least one molded part to determine residual stresses and one or more deformation profiles pertaining to the one or more portions of the at least one molded part based on the one or more curing profiles,
wherein a semi-concurrent multiscale framework is used, for both of the thermo-chemical analysis and the thermo mechanical analysis, where the at least one molded part at the macro level depend on the microscale geometric models for accessing a micro scale information at each iteration such that a dynamic interactions between varying levels acts as constitutive relationship for material modelling and allows to retain the micro scale information throughout the thermo chemical analysis and the thermo mechanical analysis.

10. The one or more non-transitory machine-readable information storage mediums of claim 9, wherein the geometry model comprises at least one of (i) one or more geometry properties and (ii) one or more material properties pertaining to manufacturing of the at least one molded part based on the design requirement, wherein the one or more geometry properties comprise at least one of (a) shape, (b) size, (c) ply thickness, (d) stacking sequence, and (e) an orientation of the composite materials, and wherein the one or more material properties comprise at least one of (a) physical, (b) chemical, (c) mechanical properties, and (d) thermal properties of the composite materials for manufacturing of the at least one molded part based on the design requirement.

11. The one or more non-transitory machine-readable information storage mediums of claim 9, wherein the step of performing, via a multiscale modeling technique executed by the one or more hardware processors, thermo chemical analysis on one or more portions of the at least one molded part is preceded by setting one or more manufacturing process parameters based on the design requirement.

12. The one or more non-transitory machine-readable information storage mediums of claim 9, wherein the one or more instructions which when executed by the one or more hardware processors further cause analyzing the determined residual stress and one or more determined deformation profiles to determine one or more modifications in at least one of (i) design of the at least one molded part, (ii) a manufacturing process and one or more manufacturing process parameters associated thereof, and (iii) the composite materials.

* * * * *